US012630026B2

(12) United States Patent (10) Patent No.: US 12,630,026 B2

Isami et al. (45) Date of Patent: May 19, 2026

(54) BATTERY ELECTRIC VEHICLE

(71) Applicant: TOYOTA JIDOSHA KABUSHIKI KAISHA, Toyota (JP)

(72) Inventors: Yoichiro Isami, Toyota (JP); Kenji Mizutani, Toyota (JP); Hirotaka Ikegami, Toyota (JP); Akihito Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 18/598,639

(22) Filed: Mar. 7, 2024

(65) Prior Publication Data

US 2024/0300505 A1 Sep. 12, 2024

(30) Foreign Application Priority Data

Mar. 9, 2023 (JP) ................................. 2023-036519

(51) Int. Cl.
B60L 15/20 (2006.01)

(52) U.S. Cl.
CPC ......... B60L 15/20 (2013.01); B60L 2240/423 (2013.01); B60L 2250/24 (2013.01); B60L 2250/26 (2013.01); B60L 2260/26 (2013.01)

(58) Field of Classification Search
CPC ... B60L 15/20; B60L 2260/26; B60W 30/182; B60W 2710/083; B60W 10/08; B60W 20/00; B60W 10/02; B60W 10/10; B60W 20/20; B60W 10/105; B60W 2510/0208; B62D 5/046
See application file for complete search history.

(56) References Cited

U.S. PATENT DOCUMENTS

| | | | | |
|---|---|---|---|---|
| 2015/0336570 A1* | 11/2015 | Sugimura | ............. | B60W 10/10 |
| | | | | 180/65.265 |
| 2017/0327004 A1* | 11/2017 | Mochizuki | ............ | B60W 10/08 |
| 2018/0065643 A1* | 3/2018 | Nishimine | .......... | B60W 50/082 |
| 2022/0041065 A1* | 2/2022 | Isami | ...................... | B60L 15/20 |

FOREIGN PATENT DOCUMENTS

| | | | | | |
|---|---|---|---|---|---|
| JP | WO2007086274 A1 | * | 7/2007 | ............ | B60W 20/00 |
| JP | 2022030479 A | * | 2/2022 | ................ | B60L 9/18 |
| JP | 2022-036845 A | | 3/2022 | | |
| JP | WO2022144963 A1 | * | 7/2022 | .......... | B60W 30/182 |

* cited by examiner

*Primary Examiner* — Hitesh Patel

(74) *Attorney, Agent, or Firm* — Finnegan, Henderson, Farabow, Garrett and Dunner LLP

(57) ABSTRACT

A battery electric vehicle includes a motor configured to output torque for driving to a drive shaft, a mode selector configured to select a driving mode from a plurality of driving modes based on driver's operation including a motor driving mode that the battery electric vehicle is driven by outputting a required torque required for driving from the motor and a gear shift driving mode that the battery electric vehicle is driven with behavior of torque output from the motor as behavior of the torque in an engine vehicle including an engine and a transmission based on the driver's shift operation, and a controller programmed to control the motor such that the battery electric vehicle drives in the driving mode selected by the mode selector. The controller is programmed to permit switching between the motor driving mode and the gear shift driving mode when a steering wheel is gripped.

4 Claims, 3 Drawing Sheets

BATTERY ELECTRIC VEHICLE

CROSS-REFERENCE TO RELATED APPLICATION

The present disclosure claims priority to Japanese Patent Application No. 2023-036519 filed on Mar. 9, 2023, which is incorporated herein by reference in its entirety including specification, drawings and claims.

TECHNICAL FIELD

The present disclosure relates to a battery electric vehicle.

BACKGROUND

A proposed battery electric vehicle is provided with a motor configured to output torque for driving, a mode selector configured to select a driving mode from a plurality of driving modes based on driver's operation including a motor driving mode and a gear shift driving mode (as described in, for example, Japanese Laid-Open Patent Publication No. 2022-036845). The motor driving mode is a driving mode that the battery electric vehicle is driven by outputting a required torque required for driving from the motor. The gear shift driving mode is a driving mode that the battery electric vehicle is driven with behavior of torque output from the motor as behavior of the torque in an engine vehicle including an engine and a transmission based on the driver's shift operation.

SUMMARY

In the battery electric vehicle described above, the driving mode is switched by the driver's operation. However, the driving mode may be switched against the driver's intention due to misoperation or other reasons. When the driving mode is switched against the driver's intention, the behavior of the vehicle may be different from the driver's intention, and the driver may be delayed in responding.

A battery electric vehicle of the present disclosure mainly aims to suppress the delay in the driver's response to changes in the behavior of the vehicle caused by switching between the motor driving mode and the gear shift driving mode. In order to achieve the above primary object, the battery electric vehicle of the present disclosure employs the following configuration.

The present disclosure is directed to a battery electric vehicle. The battery electric vehicle includes a motor configured to output torque for driving to a drive shaft, a mode selector configured to select a driving mode from a plurality of driving modes based on driver's operation including a motor driving mode that the battery electric vehicle is driven by outputting a required torque required for driving from the motor and a gear shift driving mode that the battery electric vehicle is driven with behavior of torque output from the motor as behavior of the torque in an engine vehicle including an engine and a transmission based on the driver's shift operation, and a controller programmed to control the motor such that the battery electric vehicle drives in the driving mode selected by the mode selector. The controller is programmed to permit switching between the motor driving mode and the gear shift driving mode when a steering wheel is gripped.

In the battery electric vehicle of this aspect, when the steering wheel is gripped, switching between the motor driving mode and the gear shift driving mode is permitted.

When the steering wheel is gripped, the driver is considered to be in a situation where he or she can respond relatively quickly to the behavior of the car. Permitting to switch between the motor driving mode and the gear shift driving mode when the driver is gripping the steering wheel makes it possible to suppress delay in the driver's response to changes in the vehicle behavior caused by switching between the motor driving mode and the gear shift driving mode.

DESCRIPTION OF EMBODIMENTS

The following describes some aspects of the disclosure with reference to embodiments.

Figure 1:
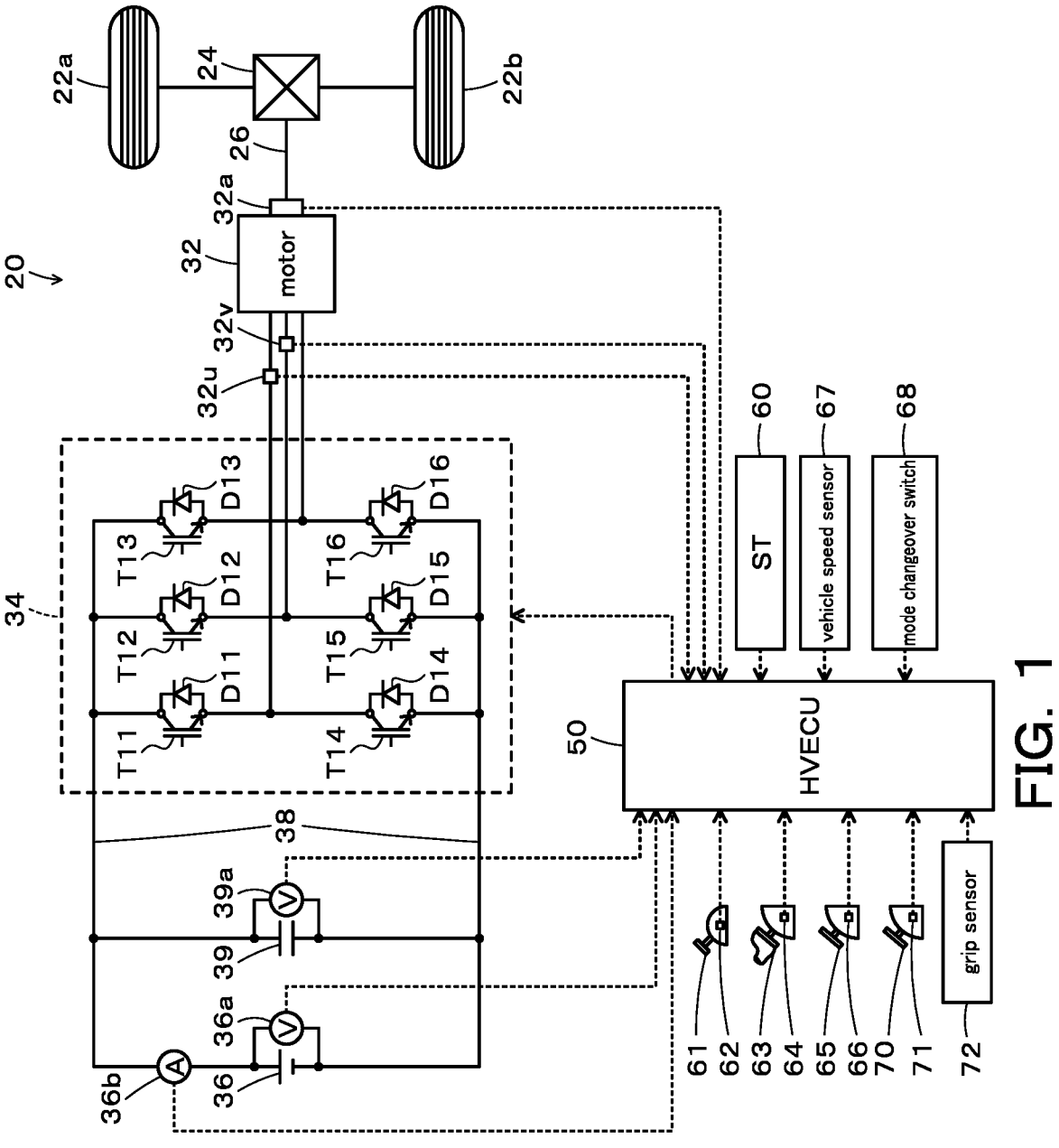
FIG. 1 is a configuration diagram illustrating the schematic configuration of a battery electric vehicle 20 according to one embodiment of the present disclosure.

FIG. 1 is a configuration diagram illustrating the schematic configuration of a battery electric vehicle 20 according to one embodiment of the present disclosure. As illustrated, the battery electric vehicle 20 of the embodiment includes a motor 32 for driving, an inverter 34, a battery 36, and an electronic control unit 50.

The motor 32 is configured as a three-phase AC motor and includes a rotor with permanent magnets embedded in a rotor core and a stator with three-phase coils wound around a stator core. The rotor of the motor 32 is connected to a drive shaft 26. The drive shaft 26 is connected to drive wheels 22a and 22b via a differential gear 24.

The inverter 34 is used to drive the motor 32. The inverter 34 is connected to the battery 36 via power line 38 and has six transistors T11 to T16 as six switching elements and six diodes D11 to D16 connected in parallel to each of the six transistors T11 to T16. The transistors T11 to T16 are arranged in pairs such that they are source and sink side to positive side line and negative side line of the power line 38, respectively. Connection points of the two transistors of each pair are connected to coils of corresponding phase (U-phase, V-phase, and W-phase) of the motor 32, respectively. Thus, when voltage is applied to the inverter 34, ratio of on-time of the paired transistors T11-T16 is adjusted by the electronic control unit 50 to form a rotating magnetic field in the three phase coils and drive the motor 32 to rotate.

The battery 36 is configured as a lithium ion rechargeable battery or a nickel metal hydride battery and is connected to the inverter 34 via the power line 38. A smoothing capacitor 39 is attached to the power line 38.

The electronic control unit 50 includes a microcomputer with a CPU, ROM, RAM, flash memory, and I/O ports. The electronic control unit 50 inputs rotational position $\theta m$ of the rotor of the motor 32 from a rotational position sensor 32a, phase currents Iu and Iv of the U and V phases of the motor 32 from current sensors 32u and 32v, voltage Vb of the battery 36 from a voltage sensor 36a, current Ib of the battery 36 from a current sensor 36b and voltage VL of the power line 38 (capacitor 39) from a voltage sensor 39a. The electronic control unit 50 inputs a start signal from a start switch 60, shift position SP that is an operating position of a shift lever 61 from a shift position sensor 62, accelerator pedal opening degree Acc that is the amount of depressing an accelerator pedal 63 from an accelerator pedal sensor 64 and brake pedal position BP that is the amount of depressing a brake pedal 65 from a brake pedal sensor 66. The electronic control unit 50 also inputs vehicle speed V from a vehicle speed sensor 67, a switch signal from mode changeover switch 68, depression amount Da of clutch pedal (pseudo-clutch pedal) 70 from clutch pedal sensor 71 and a grip signal from grip sensor 72 that detects the steering wheel gripped. The shift lever 61 is configured to simulate the shift device included in a vehicle equipped with a manual transmission. The shift lever 61 selects, as shift position SP, one of several shift ranges corresponding to the gear shift of the manual transmission to be simulated, e.g., one of the simulated first to sixth gear ranges and neutral range. Each time the mode changeover switch 68 is turned on, it outputs a mode switching instruction to switch between the motor driving mode and the gear shift driving mode. The motor driving mode and the gear shift driving mode are explained later. The clutch pedal 70 is configured to simulate a clutch pedal on the engine vehicle to be simulated. The clutch pedal 70 is configured to be similar in placement and feeling to a clutch pedal of a vehicle equipped with a manual transmission.

In the battery electric vehicle 20 of the embodiment, the electronic control unit 50 is programmed to control the motor 32 (inverter 34) such that the battery electric vehicle 20 is driven in the motor driving mode or in the gear shift driving mode. In the motor driving mode, the battery electric vehicle 20 is driven by outputting a required torque required for driving from the motor 32. In the gear shift driving mode, the battery electric vehicle 20 is driven with behavior of torque output from the motor 32 as behavior of the torque in an engine vehicle including an engine and a manual transmission based on the driver's operation of the shift lever 61.

In the motor driving mode, the electronic control unit 50 sets driving demand torque $Td^*$ required for driving (required for the drive shaft 26) to torque command $Tm^*$ of the motor 32, regardless of the shift position SP or the depression amount Da of the clutch pedal 70, and controls the transistors T11 to T16 of the inverter 34 such that the motor 32 is driven by the torque command $Tm^*$. The driving demand torque $Td^*$ is set based on the accelerator pedal opening degree Acc and vehicle speed V.

In the gear shift driving mode, the electronic control unit 50 sets the virtual engine rotation speed Ne as the engine rotation speed in a simulated engine vehicle using the rotation speed Np of the drive shaft 26 (rotation speed Nm of the motor 32), the gear ratio (transmission ratio) r corresponding to the shift position SP, and the slip ratio slip of the clutch pedal 70 based on the depression amount Da of the clutch pedal 70, and sets the virtual engine output torque Teout to be output from the engine of the simulated engine vehicle based on the accelerator pedal opening degree Acc and the virtual engine rotation speed Ne. The electronic control unit 50 calculates the transmission input torque Tmtin by multiplying the virtual engine output torque Teout by the torque transmission gain k. The torque transmission gain is the rate of torque transmission from the engine to the manual transmission based on the rate of slip of the clutch pedal 70. The torque transmission gain k is set to be smaller when the depression amount Da of the clutch pedal 70 is larger as compared with when the depression amount Da of the clutch pedal 70 is smaller, and the torque transmission gain is set to a value of 0 when the depression amount Da of the clutch pedal 70 is at the maximum amount of depression. The electronic control unit 50 calculates the transmission output torque Tmtout by multiplying the transmission input torque Tmtin by the gear ratio (transmission ratio) r corresponding to the shift position SP, sets the transmission output torque Tmtout to the torque command $Tm^*$ of the motor 32, and controls transistors T11 to T16 of inverter 34 such that motor 32 is driven by torque command $Tm^*$. Through such control, the motor 32 is controlled such that the battery electric vehicle 20 drives such that the behavior of torque output from the motor 32 based on the driver's operation of the shift lever 61 is the behavior of torque in an engine vehicle equipped with an engine and a manual transmission. In other words, this enables the battery electric vehicle 20 to simulate driving an engine vehicle equipped with an engine and manual transmission, and the driver can feel as if the driver is driving an engine vehicle equipped with an engine and manual transmission. A speaker that generates sound may be placed in a passenger compartment, and engine sound may be played from the speaker by reproducing the engine sound corresponding to the virtual engine rotation speed Ne from the engine sound for each engine rotation speed that is pre-recorded. When the shift position SP is in the neutral range, the motor 32 is controlled such that no torque is output to the drive shaft 26.

Figure 2:
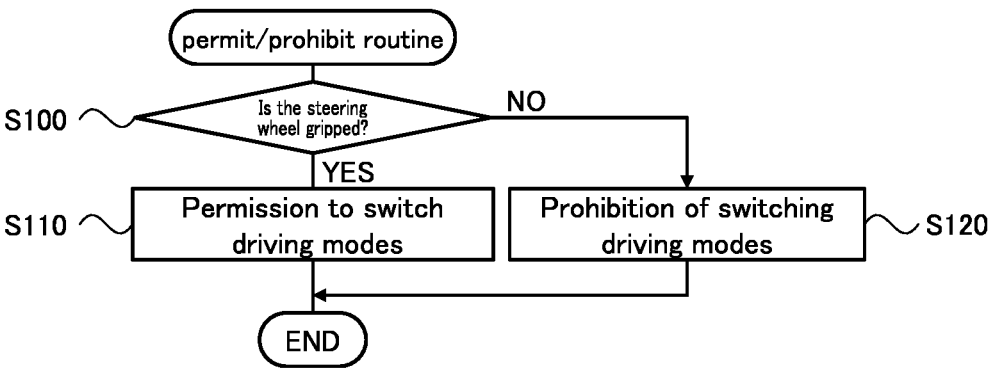
FIG. 2 is a flowchart showing one example of a permit/prohibit routine performed by an electronic control unit 50.

The following describes the operation of the battery electric vehicle 20 of the embodiment having the configuration described above or more specifically the operation when the driving mode is instructed to be switched by the mode changeover switch 68. FIG. 2 is a flowchart showing one example of a permit/prohibit routine performed by the electronic control unit 50. This routine is performed when an instruction to switch the driving mode is given by the mode changeover switch 68 during driving.

When this routine is performed, the CPU of the electronic control unit 50 determines whether the steering wheel is gripped based on the gripping signal from the grip sensor 72 (step S100). When the steering wheel is gripped, the CPU determines that the driver can quickly respond to changes in the behavior of the battery electric vehicle 20 by switching the driving mode, and permits the driving mode to be switched (step S110), and this routine is terminated. This makes it possible to suppress delay in the driver's response to changes in the vehicle behavior caused by switching between the motor driving mode and the gear shift driving mode.

When the steering wheel is not gripped in step S100, the CPU determines that switching the driving mode may delay the driver's response to changes in the behavior of the battery electric vehicle 20, and the CPU prohibits switching the driving mode (step S120), and this routine is terminated. This enables more appropriate driving because the CPU does not switch the driving modes when there may be a delay in the driver's response to changes in the vehicle behavior caused by switching between the motor driving mode and the gear shift speed driving mode.

As described above, in the battery electric vehicle 20 of the embodiment, permitting to switch the driving mode when the driver is gripping the steering wheel makes it possible to suppress delay in the driver's response to changes in the vehicle behavior caused by switching between the motor driving mode and the gear shift driving mode.

Figure 3:
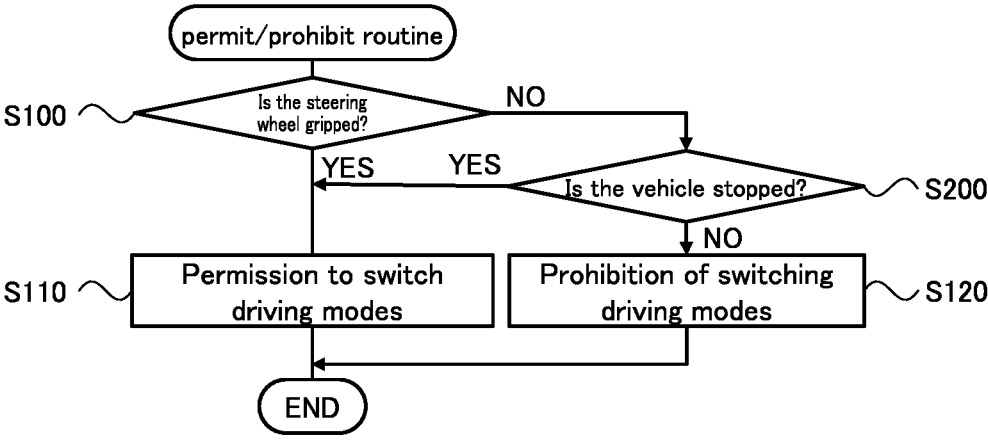
FIG. 3 is a flowchart showing one example of a permit/prohibit routine for another embodiment.

In the battery electric vehicle 20 of the embodiment, the permit/prohibit routine illustrated in FIG. 2 is performed while the vehicle is driving. However, the other embodiments of the permit/prohibit routine illustrated in FIG. 3 may be performed regardless of whether the vehicle is driving or not. In other embodiments of the permit/prohibit routine, the CPU determines whether the vehicle is stopped when the steering wheel is not gripped (step S200), permits switching of the driving mode when the vehicle is stopped (step S110), and prohibits switching of the driving mode when the vehicle is not stopped (step S120). When the vehicle is stopped, the behavior of the vehicle does not change even if the driving mode is switched. Therefore, by permitting switching between the motor driving mode and the gear shift driving mode while the vehicle is stopped, the opportunity for switching between the motor driving mode and the gear shift driving mode to be permitted increases. This enables improved convenience.

Figure 4:
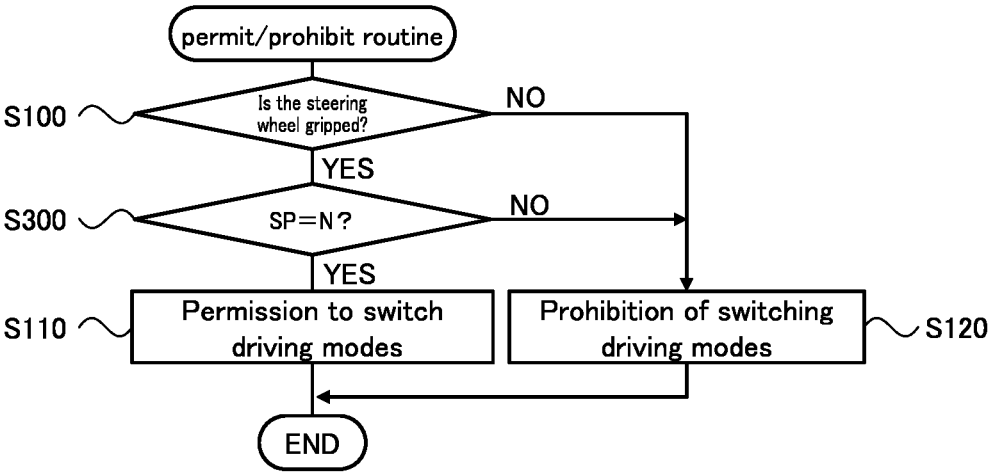
FIG. 4 is a flowchart showing one example of a permit/prohibit routine for another embodiment.

In the battery electric vehicle 20 of the embodiment, in steps S100 and S110, when the steering wheel is gripped, switching of the driving mode is permitted. However, as illustrated in the permit/prohibit routine of the other embodiment illustrated in FIG. 4, when the CPU determines in step S100 that the steering is held, the CPU determines whether the shift position SP is in the neutral (N) range (step S300), permits switching of the driving mode when the shift position SP is in the neutral (N) range (step S110), and prohibits switching of the driving mode when the shift position SP is not in the neutral (N) range (step S120). When the shift position SP is in the neutral range, the motor 32 is controlled such that no torque is output to the drive shaft 26, so the behavior of the vehicle does not change even if there is an unintended change in torque of the motor 32 due to switching of driving modes. Therefore, when the shift position SP is in the neutral range, switching between the motor driving mode and the gear shift driving mode is permitted, thereby suppressing changes in vehicle behavior caused by switching between the motor driving mode and the gear shift driving mode.

Figure 5:
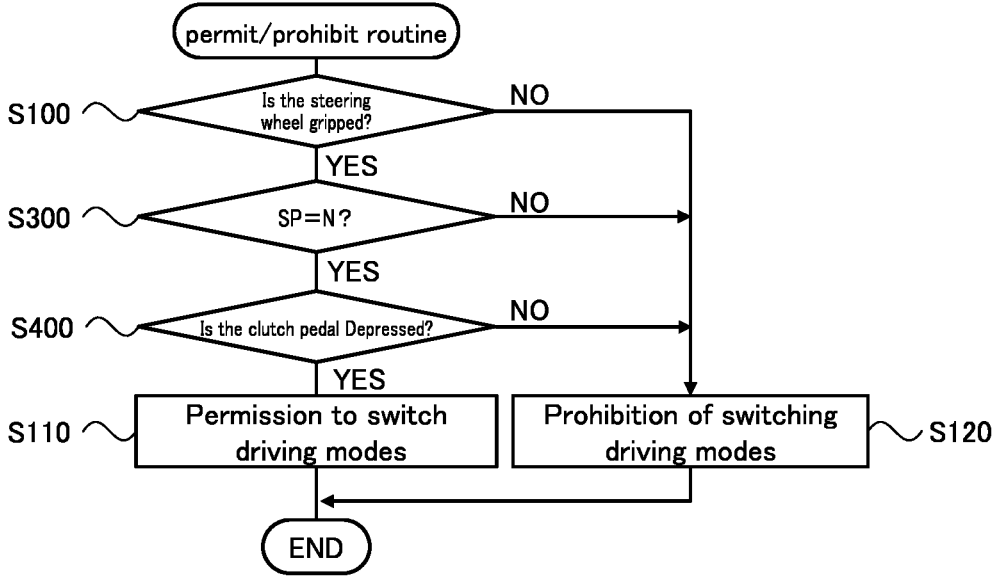
FIG. 5 is a flowchart showing one example of a permit/prohibit routine for another embodiment.

In the battery electric vehicle 20 of the embodiment, in steps S100 and S110, when the steering wheel is gripped, switching of the driving mode is permitted. However, as illustrated in the other embodiment of the permit/prohibit routine illustrated in FIG. 5, when the CPU determines that the steering is held in step S100, the CPU determines whether the shift position SP is in the neutral (N) range (step S300). When the shift position SP is in the neutral (N) range, the CPU determines whether the clutch pedal 70 is depressed based on the depression amount Da of the clutch pedal 70 from the clutch pedal sensor 71 (whether the depression amount Da of the clutch pedal 70 is the maximum amount of depression where the torque transmission gain k between the engine and manual transmission becomes value 0) (step S400). The CPU then permits switching of the driving mode when the clutch pedal 70 is depressed (step S110). When the shift position SP is not in the neutral (N) range in the step S300 or the clutch pedal 70 is not depressed in the step S400, the CPU may prohibit switching the driving mode (step S120). When the clutch pedal 70 is depressed, the behavior of the vehicle does not change even if the driving mode is switched, because the torque transmission gain k is set to the value 0 when the depression amount Da of the clutch pedal 70 is the maximum value and the motor 32 is controlled such that no torque is output for driving to the drive shaft 26. Therefore, permitting switching between the motor driving mode and the gear shift driving mode when the clutch pedal 70 is depressed enables to suppress changes in the vehicle behavior caused by switching between the motor driving mode and the gear shift mode.

In the battery electric vehicle 20 of the embodiment, the shift position SP is changed by the driver's operation of the shift lever 61. However, the present disclosure may also be applied when the battery electric vehicle includes two paddle switches located near the steering wheel and the shift position SP is changed by upshifting or downshifting based on paddle signals from the paddle switches.

As described above, a battery electric vehicle according to one aspect of the present disclosure includes a motor configured to output torque for driving to a drive shaft, a mode selector configured to select a driving mode from a plurality of driving modes based on driver's operation including a motor driving mode that the battery electric vehicle is driven by outputting a required torque required for driving from the motor, and a gear shift driving mode that the battery electric vehicle is driven with behavior of torque output from the motor as behavior of the torque in an engine vehicle including an engine and a transmission based on the driver's shift operation and a controller programmed to control the motor such that the battery electric vehicle drives in the driving mode selected by the mode selector. The controller is programmed to permit switching between the motor driving mode and the gear shift driving mode when a steering wheel is gripped.

In the battery electric vehicle of this aspect, when the steering wheel is gripped, switching between the motor driving mode and the gear shift driving mode is permitted. When the steering wheel is gripped, the driver is considered to be in a situation where he or she can respond relatively quickly to the behavior of the car. Permitting to switch between the motor driving mode and the gear shift driving mode when the driver is gripping the steering wheel makes it possible to suppress delay in the driver's response to changes in the vehicle behavior caused by switching between the motor driving mode and the gear shift driving mode.

In the battery electric vehicle of this aspect, the controller may be programmed to permit switching between the motor driving mode and the gear shift driving mode while the battery electric vehicle is stopped, even when the steering wheel is not gripped. When the vehicle is stopped, the behavior of the vehicle does not change even if the driving mode is switched. Therefore, by permitting switching between the motor driving mode and the gear shift driving mode while the vehicle is stopped, the opportunity for switching between the motor driving mode and the gear shift driving mode to be permitted increases. This enables improved convenience.

In the battery electric vehicle of this aspect, the controller may be programmed to permit switching between the motor driving mode and the gear shift driving mode when the steering wheel is gripped and shift position is in neutral range. When the shift position is in the neutral range, the motor is controlled such that no torque is output to the drive shaft, so the behavior of the vehicle does not change. Therefore, when the shift position is in the neutral range, switching between the motor driving mode and the gear shift driving mode is permitted, thereby suppressing changes in vehicle behavior caused by switching between the motor driving mode and the gear shift driving mode.

In the battery electric vehicle of this aspect, the battery electric vehicle may further include a pseudo-clutch pedal simulating a clutch pedal in the engine vehicle. The controller may be programmed to permit switching between the motor driving mode and the gear shift driving mode when the steering wheel is gripped and the pseudo-clutch pedal is depressed. When the pseudo-clutch pedal is depressed, no torque for driving is output to the drive shaft, and thus the behavior of the vehicle does not change even if torque not intended by the driver is output from the motor. Therefore, permitting switching between the motor driving mode and the gear shift driving mode when the pseudo-clutch pedal is depressed enables to suppress changes in the vehicle behavior caused by switching between the motor driving mode and the gear shift mode.

The following describes the correspondence relationship between the primary components of the embodiment and the primary components of the disclosure described in Summary. The motor 32 of the embodiment corresponds to the "motor", the mode changeover switch 68 corresponds to the "mode selector", and the electronic control unit 50 corresponds to the "controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the battery electric vehicle and so on.

What is claimed is:

1. A battery electric vehicle, comprising:
a motor configured to output torque for driving to a drive shaft;
a mode selector configured to select a driving mode from a plurality of driving modes based on a driver's operation including a motor driving mode in which the battery electric vehicle is driven by outputting a required torque required for driving from the motor and a simulated gear shift driving mode in which the battery electric vehicle is driven with behavior of torque output from the motor as behavior of torque output in an engine vehicle including an engine and a transmission based on the driver's shift operation; and
a controller programmed to control the motor such that the battery electric vehicle drives in the driving mode selected by the mode selector, wherein
the controller is programmed to permit switching between the motor driving mode and the simulated gear shift driving mode when a steering wheel of the battery electric vehicle is gripped by the driver, wherein the gripping of the steering wheel is detected by a grip sensor.

2. The battery electric vehicle according to claim 1,
wherein the controller is programmed to permit switching between the motor driving mode and the simulated gear shift driving mode while the battery electric vehicle is stopped, even when the steering wheel is not gripped by the driver.

3. The battery electric vehicle according to claim 1, wherein the controller is programmed to permit switching between the motor driving mode and the simulated gear shift driving mode when the steering wheel is gripped by the driver and a shift position is in a neutral range.

4. The battery electric vehicle according to claim 1, further comprising a pseudo-clutch pedal simulating a clutch pedal in the engine vehicle, wherein the controller is programmed to permit switching between the motor driving mode and the simulated gear shift driving mode when the steering wheel is gripped by the driver and the pseudo-clutch pedal is depressed.

* * * * *